(12) United States Patent
Takata

(10) Patent No.: US 8,240,417 B2
(45) Date of Patent: Aug. 14, 2012

(54) SNOWMOBILE INCLUDING SKIS WITH KEEL AND RUNNER

(75) Inventor: Kazunari Takata, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 127 days.

(21) Appl. No.: 12/697,494

(22) Filed: Feb. 1, 2010

(65) Prior Publication Data
US 2011/0186375 A1 Aug. 4, 2011

(51) Int. Cl.
*B62D 3/00* (2006.01)
(52) U.S. Cl. .......................................... 180/190; 280/28
(58) Field of Classification Search .................. 180/190; 280/28
See application file for complete search history.

(56) References Cited

U.S. PATENT DOCUMENTS

| | | | |
|---|---|---|---|
| 4,077,639 A | 3/1978 | Reedy | |
| 4,433,856 A * | 2/1984 | Yoshida | 180/190 |
| 4,489,954 A * | 12/1984 | Yasui et al. | 280/21.1 |
| 5,599,030 A | 2/1997 | Campbell et al. | |
| 5,700,020 A | 12/1997 | Noble | |
| 6,626,444 B2 | 9/2003 | Noble | |
| 7,096,988 B2 | 8/2006 | Moriyama | |
| 7,389,995 B2 | 6/2008 | Lemieux et al. | |
| 7,413,046 B2 | 8/2008 | Okada et al. | |
| 2003/0151216 A1 | 8/2003 | Takahiko | |
| 2004/0061296 A1 * | 4/2004 | Metheny | 280/28 |
| 2005/0039961 A1 * | 2/2005 | Moriyama | 180/190 |
| 2007/0284171 A1 | 12/2007 | Okada et al. | |
| 2009/0014969 A1 * | 1/2009 | Musselman | 280/28 |
| 2009/0152036 A1 | 6/2009 | Okada et al. | |

FOREIGN PATENT DOCUMENTS

| | | |
|---|---|---|
| JP | 2003-237681 A | 8/2003 |
| JP | 2005-59608 A | 3/2005 |

* cited by examiner

*Primary Examiner* — Tony Winner
(74) *Attorney, Agent, or Firm* — Keating & Bennett, LLP

(57) ABSTRACT

A snowmobile includes a body, a steering mechanism provided in the body, a steering shaft connected with the steering mechanism for associated operation with the steering mechanism, a power steering device provided in the steering shaft, a pair of skis, and a connecting section arranged to connect the skis with the body. Each of the skis includes, in its lower surface, a straight portion extending straightly; an approach portion ahead of the straight portion and curving upward; and a keel portion protruding downward to a lower position than the straight portion and the approach portion.

4 Claims, 15 Drawing Sheets

SNOWMOBILE INCLUDING SKIS WITH KEEL AND RUNNER

BACKGROUND OF THE INVENTION

1. Field of the Invention

The present invention relates to snowmobiles, and more specifically to a snowmobile equipped with a pair of skis.

2. Description of the Related Art

Recently, snowmobiles equipped with four-stroke engines have been manufactured in consideration of the impact upon the environment. Exhaust gas from four-stroke engines is cleaner than from two-stroke engines. However, four-stroke engines are heavier than two-stroke engines, and for this reason, a snowmobile equipped with a four-stroke engine is heavier in a front portion of its body where the engine is mounted. In this case, the rider must use a greater force when operating the steering mechanism. Thus, in an attempt to reduce the force required for the rider to operate the steering mechanism, conventional proposals are made for snowmobiles to be equipped with power steering devices (see U.S. Patent Application Laid-Open 2009/0152036 A1, for example).

Meanwhile, in addition to caring for the environment, there is also demand for faster snowmobiles. In order to accomplish a comfortable ride on the snowmobile at high speeds, improvements are further desired for straight travel and for cornering characteristics.

SUMMARY OF THE INVENTION

Therefore, preferred embodiments of the present invention provide a snowmobile which has improved characteristics in straight travel and cornering, without increasing a steering load.

According to a preferred embodiment of the present invention, a snowmobile preferably includes a body; a steering mechanism provided on the body; a steering shaft connected with the steering mechanism for associated operation with the steering mechanism; a power steering device provided in the steering shaft; a pair of skis; and a connecting section connecting the skis with the body and supporting the skis for pivotal movement in a horizontal direction about a first pivot axis in association with the steering shaft and for pivotal movement in the vertical direction about a second pivot axis which extends in a widthwise direction of the body. With the above arrangement, the first pivot axis is located at a more forward position than the second pivot axis in a horizontal plane which includes the second pivot axis. Further, each of the skis has, in its lower surface, a straight portion extending straightly, an approach portion ahead of the straight portion and curving upward, and a keel portion protruding downward to a lower position than the straight portion and the approach portion, wherein a horizontal distance between the second pivot axis and a rear end of the straight portion is longer than a horizontal distance between the second pivot axis and a fore end of the straight portion, and the keel portion has its fore end at a lower position than the second pivot axis, when the straight portion is horizontal.

In a preferred embodiment of the present invention, the rider's operation on the steering mechanism is transmitted to the skis via the steering shaft and the connecting section, and thus the pair of skis is pivoted about the first pivot axis in a horizontal direction. As a result, the snowmobile is steered.

In the above, according to the present preferred embodiment, when the straight portions in the skis' lower surfaces are horizontal, the horizontal distance between the rear end of the straight portion and the second pivot axis is longer than the horizontal distance between the fore end of the straight portion and the second pivot axis. In this case, it is possible in the straight portion to ensure an area of contact between a rearward segment which is behind the second pivot axis and the snow surface. This makes it possible to improve a straight travel characteristic of the snowmobile. It should be noted that even if the straight portion has an extended rear segment behind the second pivot axis, the power steering device assists rotating operation of the steering shaft, thereby preventing the steering load from increasing.

Also, within the horizontal plane which includes the second pivot axis, the first pivot axis is located at a more forward position than the second pivot axis. Therefore, when the skis pivot in a horizontal direction, the pivot center of each lower surface in the skis is at a more forward position than the second pivot axis. In this case, when the steering mechanism is operated by a large steering angle (when the body makes a sharp turn), a portion of the ski's lower surface under the second pivot axis moves to outside of the first pivot axis with respect to the turning direction. Meanwhile, even if the ski pivots in the vertical direction, the portion of the ski's lower surface under the second pivot axis pivots very little in the vertical direction. Therefore, even when the body makes a sharp turn, it is possible to surely support the load from the body by the portion of the ski's lower surface under the second pivot axis. This reduces rolling of the body during cornering operations, i.e., this improves a cornering characteristic of the snowmobile. It should be noted that generally, in order to improve the cornering characteristic of a snowmobile, it is necessary to increase the length of a portion ahead of the second pivot axis in the ski. In this case, however, it becomes difficult to improve the straight travel characteristic. For this reason, conventionally, it has not been easy to improve both the straight travel characteristic and the cornering characteristic. On the contrary, according to the preferred embodiments of the present invention, it is possible to improve the cornering characteristic as described above, by an arrangement in which the first pivot axis is located at a more forward position than the second pivot axis within the horizontal plane which includes the second pivot axis. This eliminates the need for increasing the length of the portion ahead of the second pivot axis in the ski in order to improve the cornering characteristic, making it possible to improve both the straight travel characteristic and the cornering characteristic.

Also, when the straight portion of the lower surface in the ski is horizontal, the fore end of the keel portion is at a lower position than the second pivot axis. In other words, the keel portion is not provided in the approach portion on its fore side (above side) of the ski. In this case, even if a rut, etc., is already formed on the snow surface, the keel portion is not easily set in the rut, etc., when the approach portion makes contact with the snow surface. This provides easy steering of the snowmobile, and provides a comfortable ride on the snowmobile.

Preferably, the keel portion includes a side surface, and the side surface has a region of a larger area defined by the second pivot axis and the rear end of the straight portion than another region defined by the second pivot axis and the fore end of the straight portion, when the straight portion is horizontal. In this case, it is possible to ensure a snow contact area in a region behind the second pivot axis and ahead of the rear end of the straight portion, in the side surface of the keel portion. This makes it possible to further improve the straight travel characteristic of the snowmobile. It should be noted that the region defined by the second pivot axis and the rear end of the straight portion includes a region which is behind the second pivot axis and is ahead of the rear end of the straight portion; further, the region defined by the second pivot axis and the fore end of the straight portion includes a region which is ahead of the second pivot axis and is behind the fore end of the straight portion.

Preferably, the snowmobile further includes a pair of runners, each runner being provided in the lower surface of the ski; and a pair of chip members, each chip member being provided in the runner and protruding downward to a lower position than the runner. With this arrangement, each of the chip members has a center in a fore-aft direction located at a more forward position than the second pivot axis. In this case, it is possible to make the center of the chip member close to the pivot center in the lower surface of the ski. This makes it possible to further improve the cornering characteristic of the snowmobile.

Preferably, the snowmobile is equipped with a four-stroke engine in a front portion of the body as a power source for travel. In this case, the exhaust gas is cleaner and the snowmobile's straight travel and cornering characteristics are improved.

It should be noted that the expression that the skis pivot in a horizontal direction does not only mean that the skis pivot in a horizontal direction but also includes cases where the skis pivot obliquely with respect to the horizontal plane.

Other elements, features, steps, characteristics and advantages of the present invention will become more apparent from the following detailed description of the preferred embodiments with reference to the attached drawings.

BRIEF DESCRIPTION OF THE DRAWINGS

FIG. 4A is a front view of the ski whereas FIG. 4B is a side view thereof.

DETAILED DESCRIPTION OF THE PREFERRED EMBODIMENTS

Hereinafter, preferred embodiments of the present invention will be described with reference to the drawings.

Figure 1:
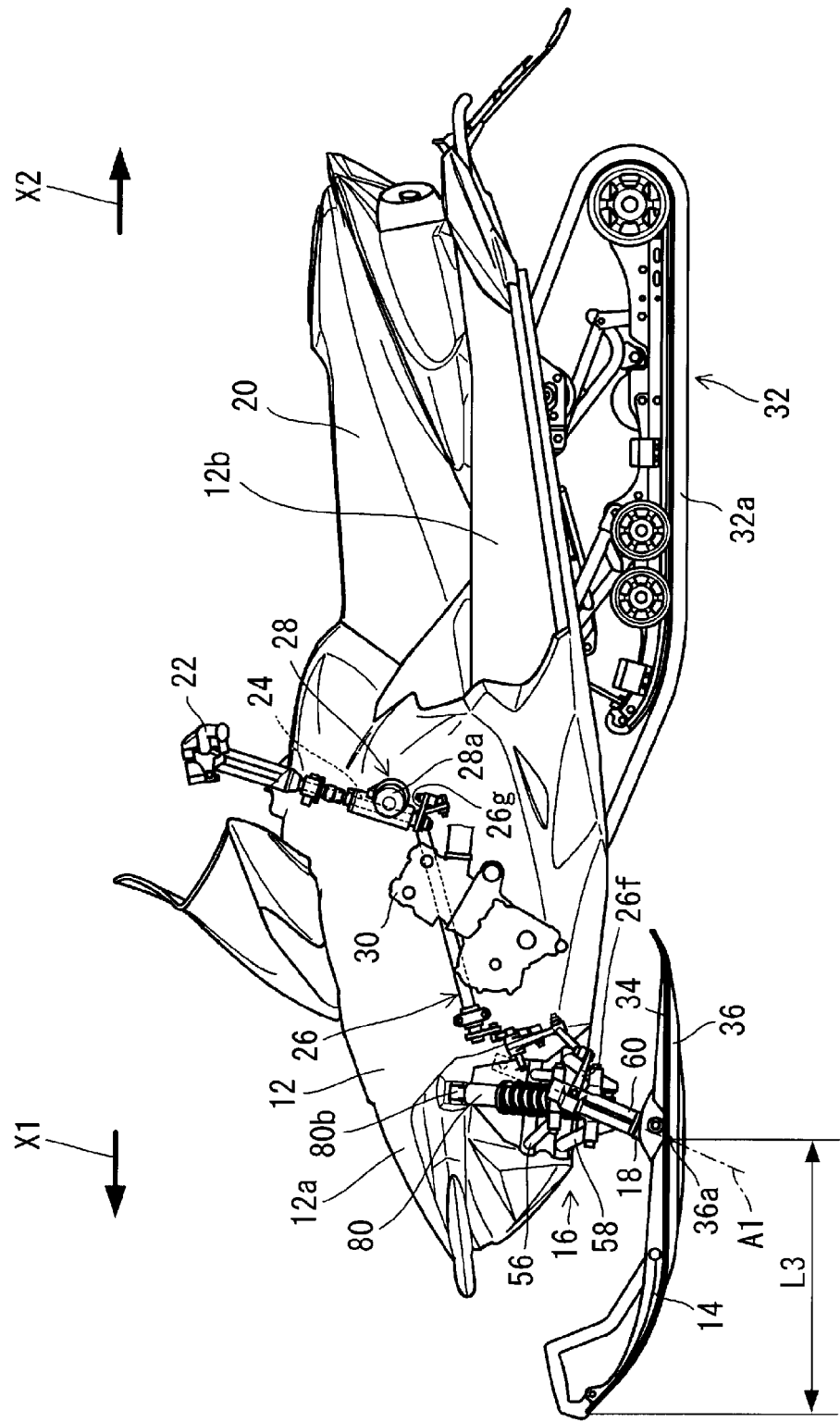
FIG. 1 is a side view showing a snowmobile according to a preferred embodiment of the present invention.
Figure 2:
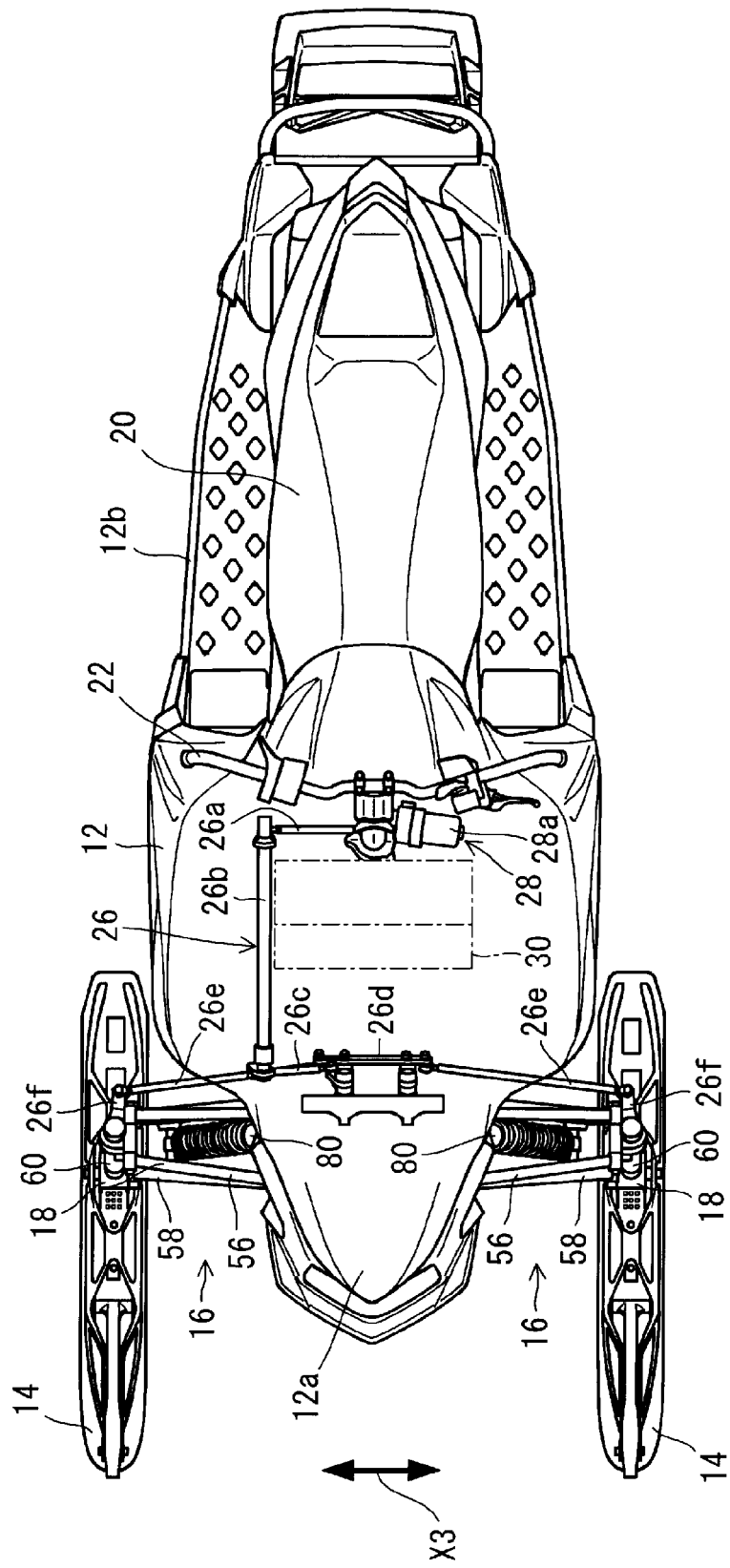
FIG. 2 is a plan view of the snowmobile in FIG. 1.

FIG. 1 is a side view of a snowmobile 10 according to a preferred embodiment of the present invention whereas FIG. 2 is a plan view of the snowmobile 10 in FIG. 1. In FIG. 1 and FIG. 2, the snowmobile 10 is shown as a conceptual drawing so that its internal structure will be easily understood. Also, in the description hereinafter, a direction indicated by Arrow X1 in FIG. 1 (direction in which the snowmobile 10 travels forward) will be called a forward direction, a direction indicated by Arrow X2 will be called a rearward direction, and a direction indicated by Arrow X3 in FIG. 2 will be called a widthwise direction.

Referring to FIG. 1 and FIG. 2, the snowmobile 10 includes a body 12 and a pair of skis 14. The skis 14 are laid in parallel to each other, extending in the fore-aft direction so as to sandwich the body 12. The body 12 has a front portion 12a, where a pair of arm mechanisms 16 are provided, extending in the widthwise direction of the body 12. Each arm mechanism 16 is linked to one of the skis 14 via a column assembly 18. Thus, the front portion 12a of the body 12 is supported by the skis 14. The skis 14, the arm mechanisms 16, and the column assemblies 18 will be described in detail below.

Referring to FIG. 1, the body 12 has a rear portion 12b, on top of which a seat 20 is provided. In the body 12, ahead of the seat 20, a steering mechanism 22 and a steering shaft 24 are arranged to pivot. The steering shaft 24 is connected with the steering mechanism 22 so as to move in association with the steering mechanism 22.

Figure 3:
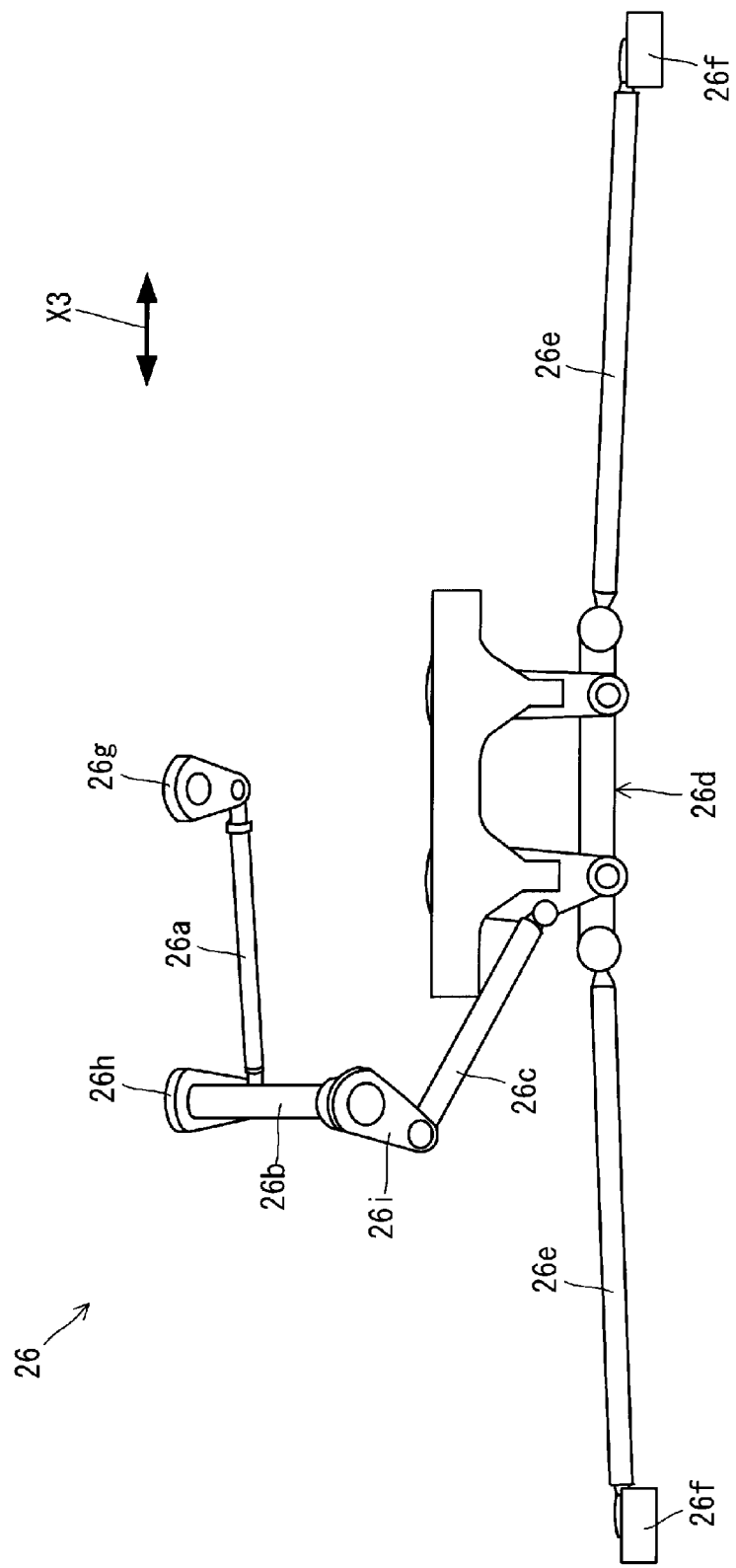
FIG. 3 is a front view showing a link mechanism.

A link mechanism 26 is provided in the body 12 so that the skis 14 are moved in association with the steering shaft 24. FIG. 3 is a front view which shows the link mechanism 26. Referring to FIG. 2 and FIG. 3, the link mechanism 26 includes a first rod 26a, a second rod 26b, a third rod 26c, a transfer portion 26d, a pair of fourth rods 26e and a pair of pivot members 26f. Referring to FIG. 1 and FIG. 3, the first rod 26a (see FIG. 3) is connected with the steering shaft 24 (see FIG. 1) via a connecting member 26g. Referring to FIG. 3, the first rod 26a and the second rod 26b are connected with each other via a connecting member 26h. The second rod 26b and the third rod 26c are connected with each other via a connecting member 26i. The third rod 26c is connected with the transfer member 26d. The fourth rods 26e are connected with the transfer member 26d. Each of the pivot members 26f is connected with a corresponding one of the fourth rods 26e. A torque received by the steering shaft 24 (see FIG. 1) is transmitted via the first rod 26a, the second rod 26b, and the third rod 26c to the transfer portion 26d. Based on the force transmitted from the third rod 26c, the transfer portion 26d moves the pair of fourth rods 26e in and out in the widthwise direction (Arrow X3 direction). The in-out movement of the fourth rods 26e is transmitted by the pivot members 26f to respective shaft members 82 (see FIG. 8), to be described below, of the column assemblies 18. Thus, the shaft member 82 (see FIG. 8) rotates about a first pivot axis A1 to be described below (see FIG. 1 and FIG. 8), pivoting the pair of skis 14 in a horizontal direction. As a result, the snowmobile 10 is steered.

Referring to FIG. 1, the steering shaft 24 is connected with a power steering device 28 which has a motor 28a. The power steering device 28 assists the rotating movement of the steering shaft 24 using a driving force generated by the motor 28a.

Referring to FIG. 1 and FIG. 2, an engine 30 is mounted in the front portion 12a of the body 12, at a widthwise center position. It should be noted here that FIG. 2 shows the engine 30 in a simplified form so that the figure will not be too complicated. The engine 30 is preferably a four-cylinder, four-stroke engine with a displacement of about 1,000 cc, for example.

Referring to FIG. 1, a track system 32 is provided in the rear portion 12b of the body 12, on a lower side thereof. The rear portion 12b of the body 12 is supported by the track system 32. The track system 32 includes a track belt 32a. Power from the engine 30 is transmitted by an unillustrated transmission mechanism to the track belt 32a, whereby the track belt 32a is driven and the snowmobile 10 travels forward.

Hereinafter, detailed description will be made of a configuration of the skis 14, the arm mechanisms 16, and the column assemblies 18.

Figure 4:
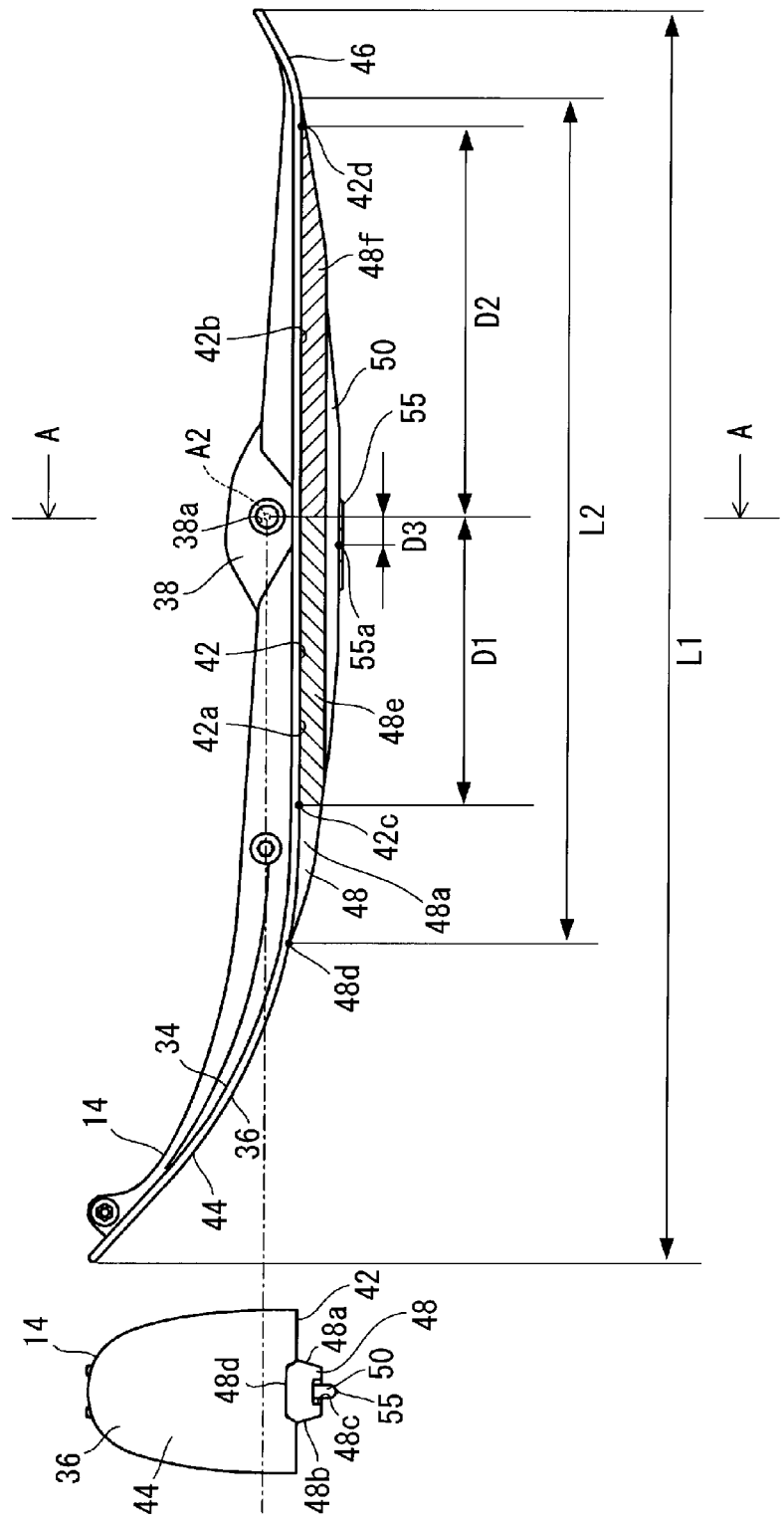
FIG. 4A and FIG. 4B are diagrams for describing skis in detail.
Figure 5:
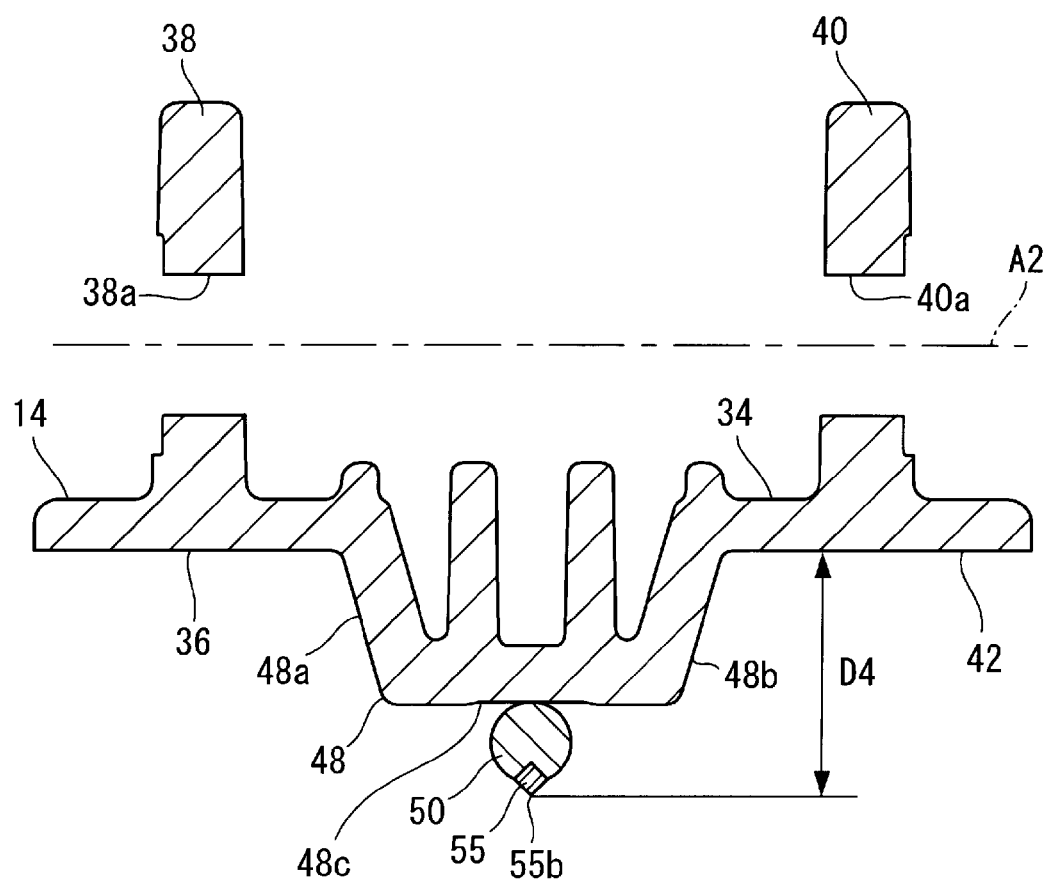
FIG. 5 is an end view taken along lines A-A in FIG. 4B.
Figure 6:
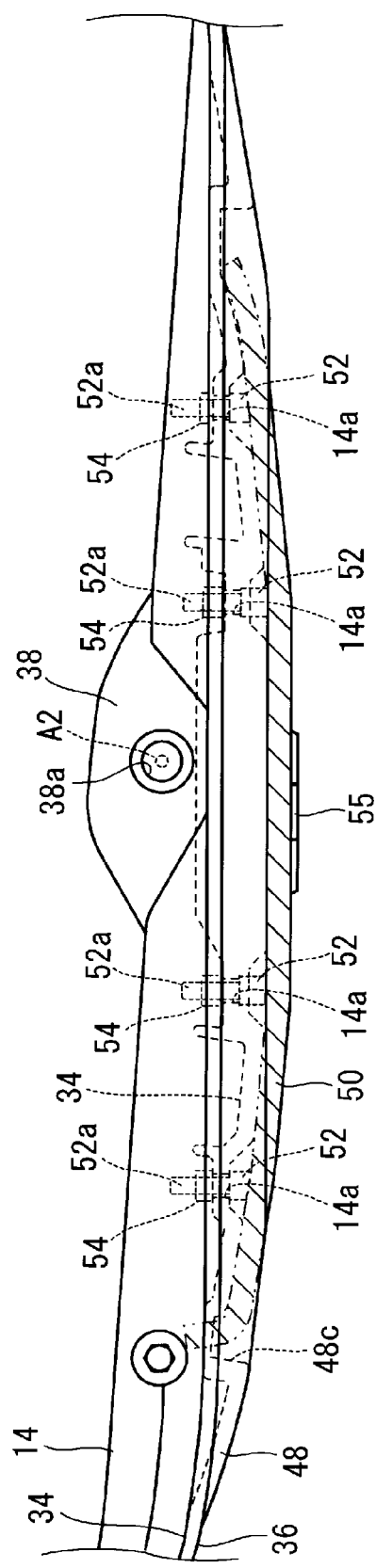
FIG. 6 is an enlarged side view of the ski.
Figure 7:
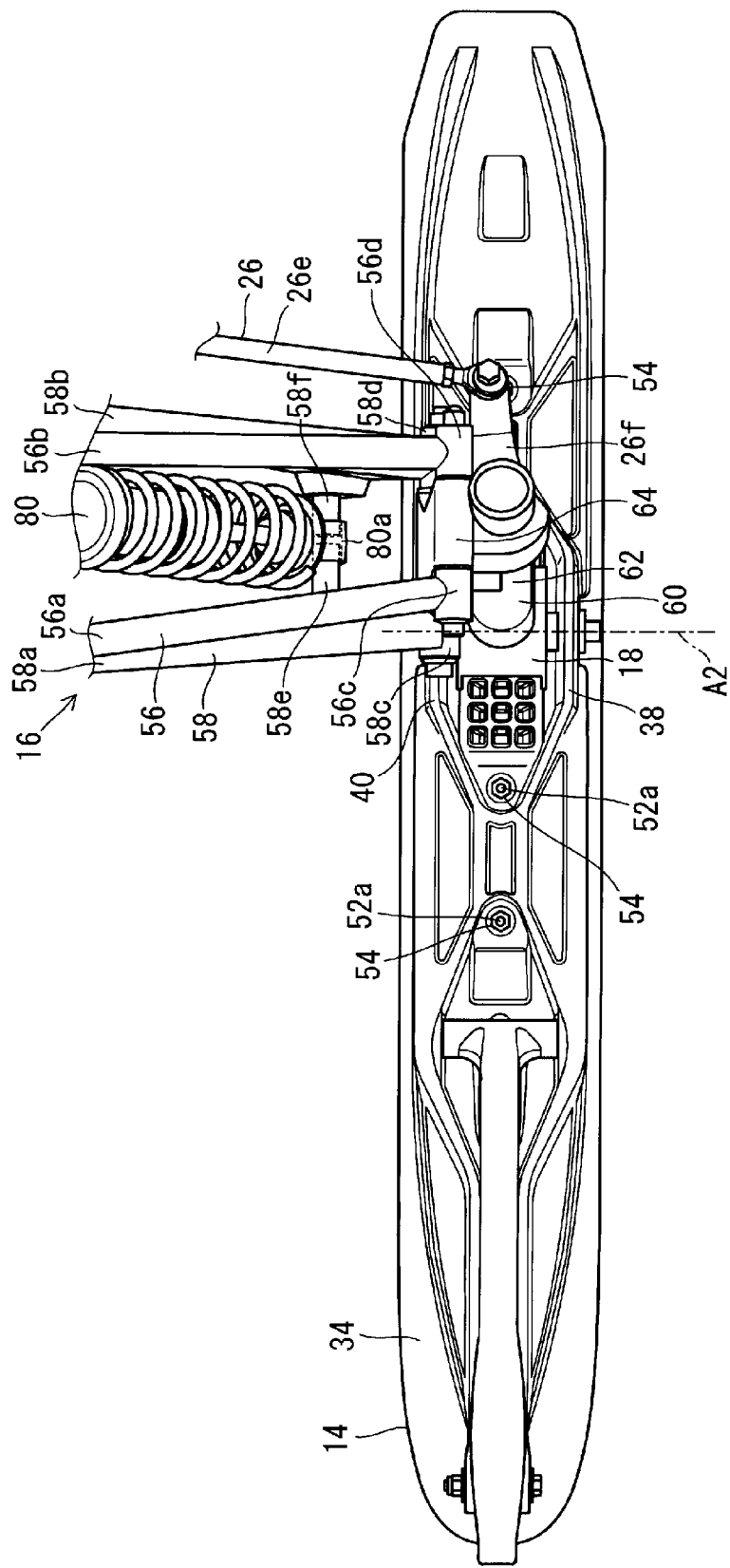
FIG. 7 is an enlarged plan view showing a relationship between the ski, an arm mechanism, and a column assembly.

First, the skis 14 will be described. FIG. 4A and FIG. 4B are diagrams for describing the skis 14 in detail. FIG. 4A is a front view of the ski 14, FIG. 4B is a side view thereof, and FIG. 5 is an end view taken along lines A-A in FIG. 4B. FIG. 6 is an enlarged side view of the ski 14. FIG. 7 is an enlarged plan view which shows a relationship between the ski 14, the arm mechanism 16, and the column assembly 18.

Referring to FIG. 4A, FIG. 4B, FIG. 5, and FIG. 6, the ski 14 has an upper surface 34 and a lower surface 36. Referring to FIG. 4B, FIG. 5, FIG. 6 and FIG. 7, the upper surface 34 includes a pair of upward protruding side wall portions 38, 40 (FIG. 4B and FIG. 6 show only the side wall portion 38). The side wall portions 38, 40 are substantially parallel to each other, and are substantially parallel with respect to a longitudinal direction of the ski 14. Referring to FIG. 5, the side wall portion 38 has a through-hole 38a and the side wall portion 40 has a through-hole 40a opposed to the through-hole 38a. The center of the through-hole 38a and that of the through-hole 40a are on a second pivot axis A2 which extends parallel or substantially parallel with respect to the widthwise direction of the ski 14 (the body 12). The second pivot axis A2 will be described below.

Referring to FIG. 4A, FIG. 4B, and FIG. 5, the lower surface 36 of the ski 14 has a straight portion 42 extending straightly in a horizontal direction; an approach portion 44 (see FIG. 4A and FIG. 4B), which is a portion ahead of the straight portion 42, curving upward to extend beyond the second pivot axis A2; a rear portion 46 (see FIG. 4B), which is a portion curving upward behind the straight portion 42; and a keel portion 48 protruding downward to a lower position than the straight portion 42. It should be noted here that up, down, fore and aft in describing the ski 14 are determined based on perceptions of up, down, fore and aft when the straight portion 42 is horizontal.

Referring to FIG. 4B, the straight portion 42 includes a first straight portion 42a, which is a portion ahead of the second pivot axis A2; and a second straight portion 42b, which is a portion behind the second pivot axis A2. When the straight portion 42 is horizontal, a horizontal distance D1 between a fore end 42c of the first straight portion 42a and the second pivot axis A2 is shorter than a horizontal distance D2 between a rear end 42d of the second straight portion 42b and the second pivot axis A2. The distance D2 is preferably approximately 1.3 times the distance D1, for example. The distance D1 can be about 240 mm, for example, whereas the distance D2 can be about 320 mm, for example. It should be noted here that the lower surface 36 preferably has a horizontal length L1 of about 1040 mm, for example, whereas the keel portion 48 preferably has a horizontal length L2 of about 705 mm, for example.

Referring to FIG. 4A, the keel portion 48 has a substantially symmetric shape in the right-left direction. The keel portion 48 has downward extending side surfaces 48a, 48b (see FIG. 4A and FIG. 5) and a recess 48c (see FIG. 4A, FIG. 5 and FIG. 6) recessed upward along a widthwise center portion. Referring to FIG. 4A and FIG. 4B, the keel portion 48 has a fore end 48d located at a lower position than the second pivot axis A2. In the side surface 48a of the keel portion 48, a region 48e under the first straight portion 42a (region ahead of the second pivot axis A2 and behind the fore end 42c of the straight portion 42, i.e., a region hatched with a rightward-rising pattern) has a smaller area than a region 48f under the second straight portion 42b (region behind than the second pivot axis A2 and ahead of the rear end 42d of the straight portion 42, i.e., a region hatched with a leftward-rising pattern). Likewise, in the side surface 48b of the keel portion 48 (see FIG. 4A), a region (not illustrated) under the first straight portion 42a has a smaller area than a region (not illustrated) under the second straight portion 42b.

Referring to FIG. 6, the recess 48c is fitted with a runner 50. FIG. 6 shows the runner 50 with hatches so that the shape of the runner 50 can be understood easily. In the runner 50, on an upper side thereof, four bolts 52 are fixed. Each bolt 52 has a shank 52a, which is inserted into one of four through-holes 14a in the ski 14. Referring to FIG. 6 and FIG. 7, each shank 52a is threaded by a nut 54 from the upper surface 34 side of the ski 14 (FIG. 7 shows two shanks 52a and three nuts 54 only). Thus, the runner 50 is fixed to the ski 14.

Referring to FIG. 4B and FIG. 5, in the runner 50, a chip member 55, which has a diamond-shaped section is fixed at a substantially center portion in the fore-aft direction (longitudinal direction). Referring to FIG. 5, the chip member 55 has its upper portion buried into the runner 50, and a lower portion protruding downward from the runner 50. Referring to FIG. 4B, the chip member 55 has a center 55a in the fore-aft direction (longitudinal direction), which is located at a more forward position than the second pivot axis A2. When the straight portion 42 is horizontal, a horizontal distance D3 between the center 55a and the second pivot axis A2 preferably is about 24 mm, for example. The chip member 55 is made of a material which has a greater hardness than the runner 50 (examples include alloys containing tungsten, cobalt or the like). Referring to FIG. 5, when the straight portion 42 is horizontal, a vertical distance D4 between the straight portion 42 and a lower end 55b of the chip member 55 preferably is about 33 mm, for example.

Next, the arm mechanism 16 will be described. Referring to FIG. 1, FIG. 2, FIG. 7, and FIG. 8, each arm mechanism 16 includes an upper arm mechanism 56, a lower arm mechanism 58, and a steering knuckle 60. Referring to FIG. 1, the upper arm mechanism 56 and the lower arm mechanism 58 are pivotably attached to the body 12.

Figure 8:
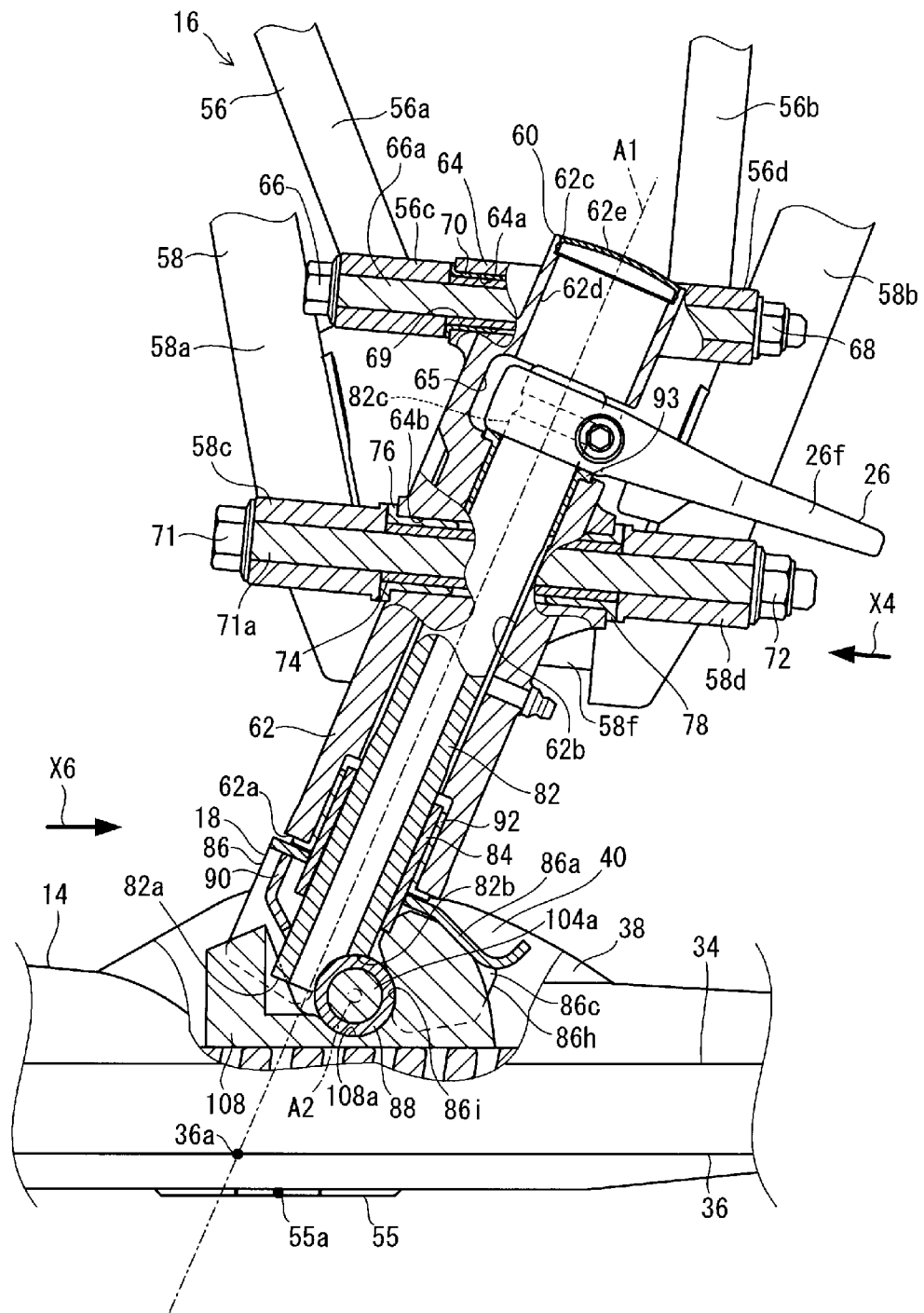
FIG. 8 is an enlarged side view showing a relationship between the ski, the arm mechanism, and the column assembly.

Referring to FIG. 7 and FIG. 8, the upper arm mechanism 56 includes an arm 56a on a forward side and an arm 56b which is on a more rearward side than the arm 56a. The arm 56a has an end with a cylindrical portion 56c and the arm 56b has an end with a cylindrical portion 56d. The lower arm mechanism 58 includes an arm 58a on a forward side and an arm 58b which is on a more rearward side than the arm 58a. The arm 58a has an end with a cylindrical portion 58c and the arm 58b has an end with a cylindrical portion 58d.

Figure 9:
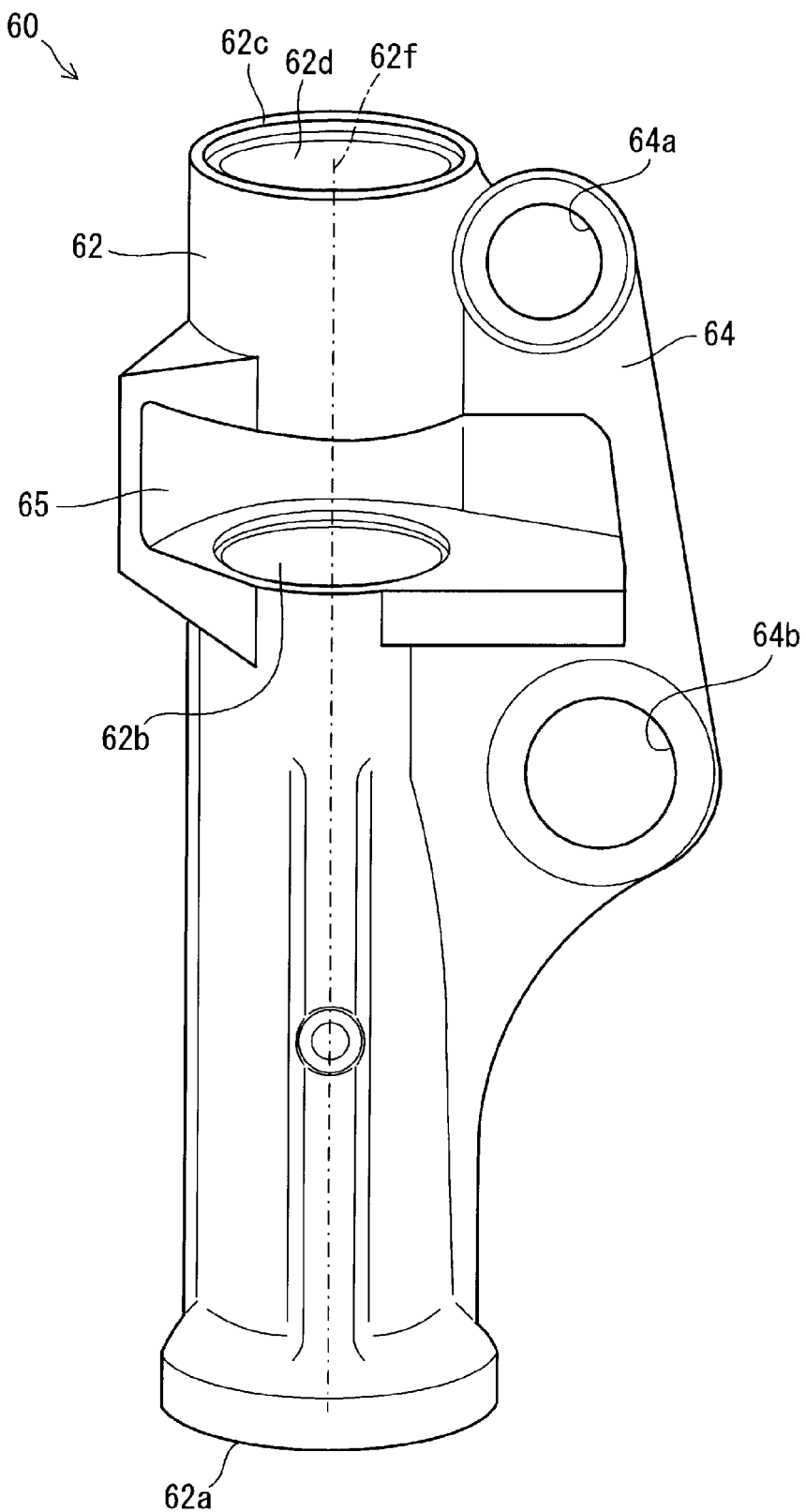
FIG. 9 is a rear view showing a steering knuckle.

FIG. 9 is a rear view of the steering knuckle 60 (as viewed in Arrow X4 direction in FIG. 8). Referring to FIG. 9, the steering knuckle 60 has a generally cylindrical main body portion 62 extending in the vertical direction; a connection portion 64 extending laterally from the main body portion 62; and a recess 65 which is formed in the main body portion 62 as well as in the connection portion 64 and which opens rearward. Referring to FIG. 8 and FIG. 9, in the main body portion 62, a communication hole 62b provides communication between a lower end 62a and the recess 65; and a communication hole 62d provides communication between an upper end 62c and the recess 65. Referring to FIG. 9, the connection portion 64 has an upper portion with a through-hole 64a penetrating in the fore-aft direction (depth direction in FIG. 9). The connection portion 64 has a lower portion with through-hole 64b penetrating in the fore-aft direction (depth direction FIG. 9). Referring to FIG. 7, when the steering knuckle 60 is assembled into the arm mechanism 16, the connection portion 64 is located on the upper arm mechanism 56 side (the lower arm mechanism 58 side).

Referring to FIG. 8, in the upper end 62c of the main body portion 62, a cap 62e blocks the communication hole 62d. A shank 66a (see FIG. 8) of a bolt 66 (see FIG. 8) is rotatably inserted through the cylindrical portion 56c (see FIG. 7 and FIG. 8) of the arm 56a (see FIG. 7 and FIG. 8); the through-hole 64a (see FIG. 8 and FIG. 9) of the connection portion 64 (see FIG. 7 through FIG. 9); and the cylindrical portion 56d (see FIG. 7 and FIG. 8) of the arm 56b (see FIG. 7 and FIG. 8). Referring to FIG. 8, the shank 66a has its tip portion threaded by a nut 68. Thus, the upper arm mechanism 56 is pivotably attached to the steering knuckle 60. It should be noted here that inside the through-hole 64a, the shank 66a has its outer circumferential surface surrounded by a cylindrical collar 69. The collar 69 has its outer circumferential surface surrounded by a generally cylindrical bushing 70 (see FIG. 8) between the cylindrical portion 56c (see FIG. 7 and FIG. 8) and the connection portion 64 (see FIG. 7 through FIG. 9). Likewise, the outer circumferential surface of the collar 69 (see FIG. 8) is also surrounded by a bushing (not illustrated) between the cylindrical portion 56d (see FIG. 7 and FIG. 8) and the connection portion 64 (see FIG. 7 through FIG. 9).

A shank 71a (see FIG. 8) of a bolt 71 (see FIG. 8) is rotatably inserted through a cylindrical portion 58c (see FIG. 7 and FIG. 8) of the arm 58a (see FIG. 7 and FIG. 8), the through-hole 64b (see FIG. 8 and FIG. 9) of the connection portion 64 (see FIG. 7 through FIG. 9), and a cylindrical portion 58d (see FIG. 7 and FIG. 8) of the arm 58b (see FIG. 7 and FIG. 8). Referring to FIG. 8, the shank 71a has its tip portion threaded by a nut 72. Thus, the lower arm mechanism 58 is pivotably fixed to the steering knuckle 60. Inside the through-hole 64b, the shank 71a has its outer circumferential surface surrounded by a cylindrical collar 74. The collar 74 has its outer circumferential surface surrounded by a generally cylindrical bushing 76 (see FIG. 8) between the cylindrical portion 58c (see FIG. 7 and FIG. 8) and the connection portion 64 (see FIG. 7 through FIG. 9) and also surrounded by a generally cylindrical bushing 78 (see FIG. 8) between the cylindrical portion 58d (see FIG. 7 and FIG. 8) and the connection portion 64 (see FIG. 7 through FIG. 9).

Referring to FIG. 7, the arm 58a is provided with a cylindrical projection 58e projecting toward the arm 58b and the arm 58b is provided with a cylindrical projection 58f projecting toward the arm 58a. The projection 58e and the projection 58f oppose each other with a space in between. A shock absorber 80 has an annular fitting 80a at its lower end and an annular fitting 80b (see FIG. 1) at its upper end. The fitting 80a of the shock absorber 80 is rotatably attached to the projections 58e, 58f. Likewise, referring to FIG. 1, the fitting 80b of the shock absorber 80 is rotatably attached to an unillustrated frame of the body 12. As a result of these, the shock absorber 80 is pivotable with respect to the body 12 and the arm mechanism 16.

Figure 10:
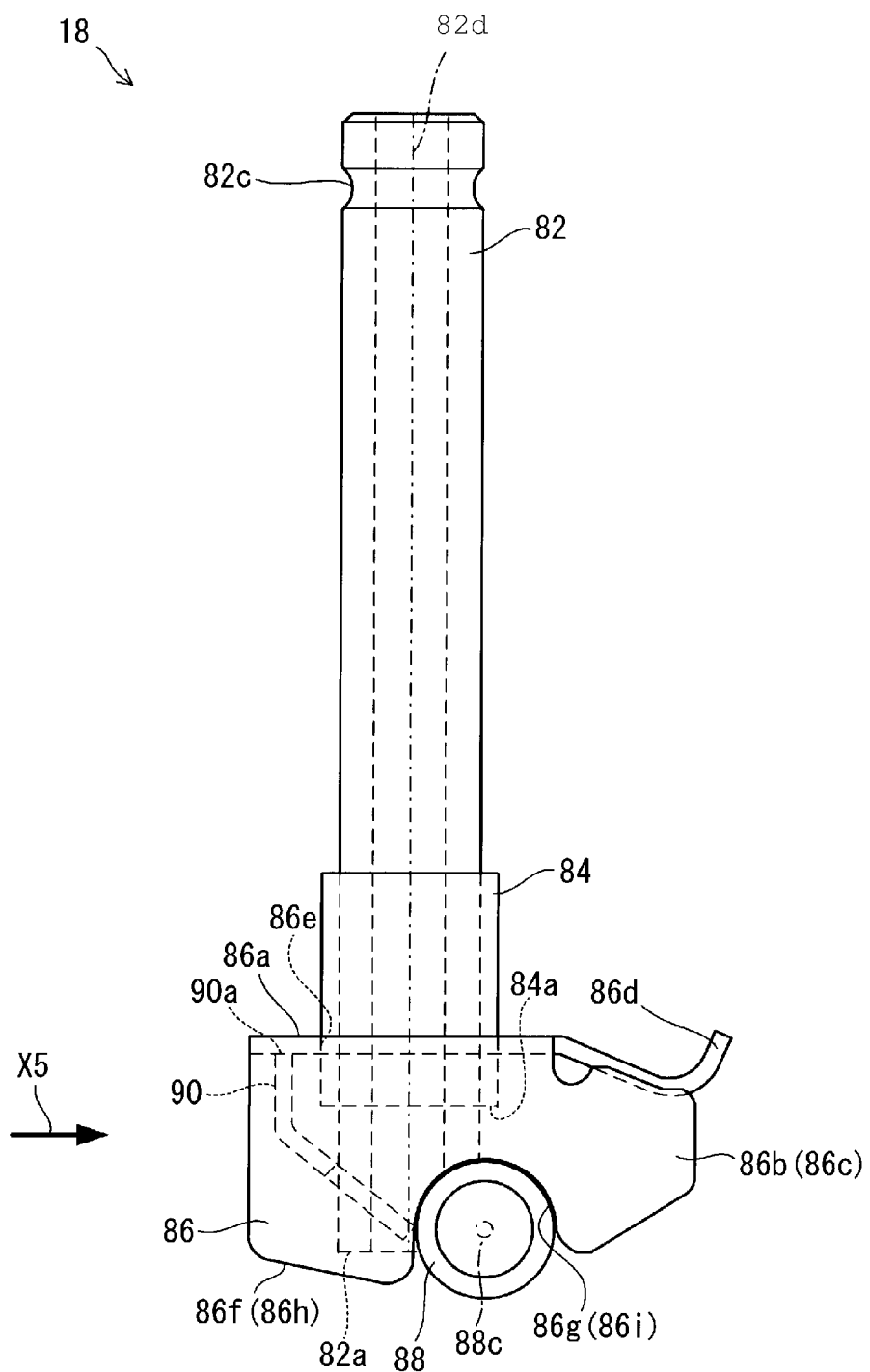
FIG. 10 is a side view showing a column assembly.
Figure 11:
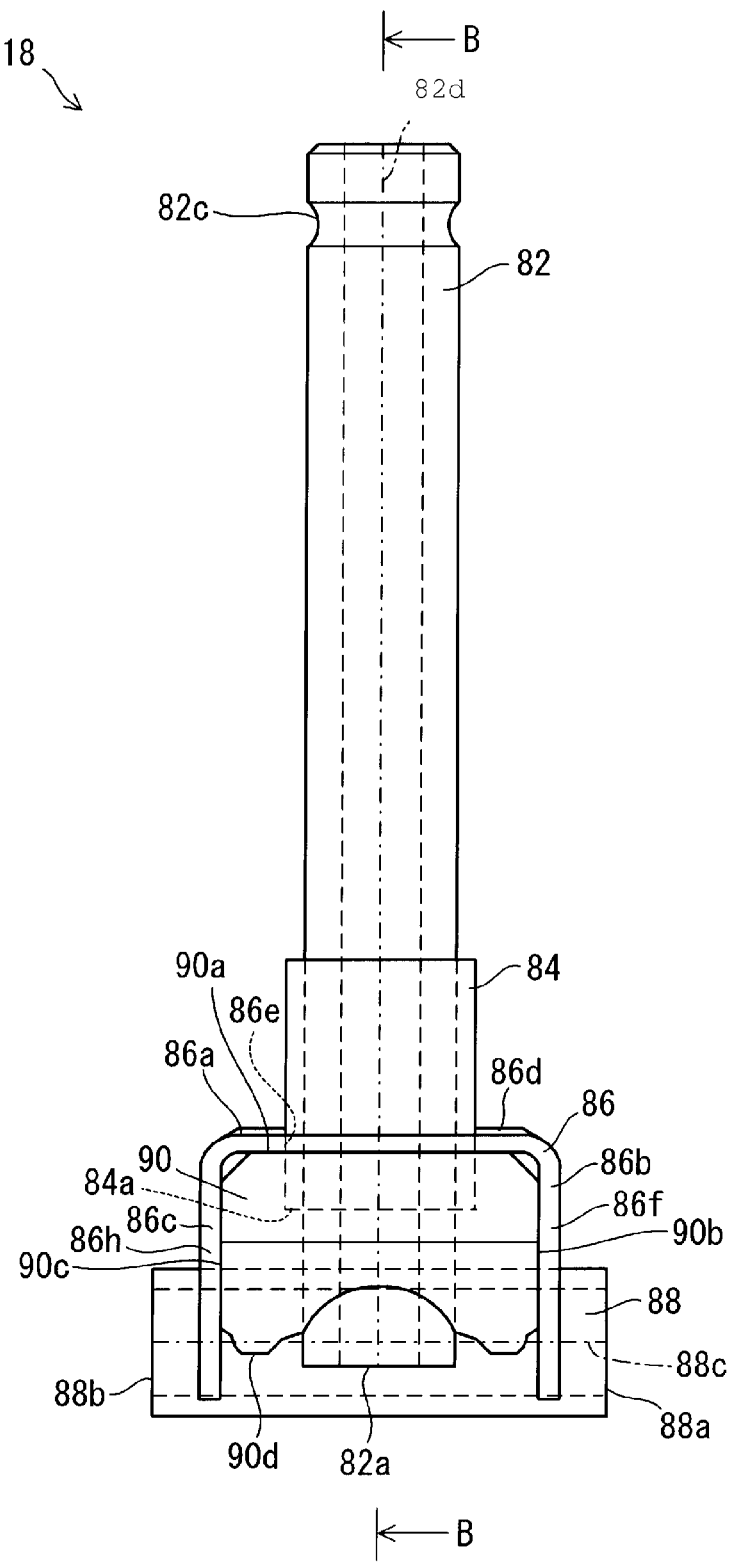
FIG. 11 is a front view showing the column assembly.

Referring to FIG. 7 and FIG. 8, the steering knuckle 60 is connected with the ski 14 via the column assembly 18. FIG. 10 is a side view of the column assembly 18 whereas FIG. 11 is a front view of the column assembly 18 (when the column assembly 18 is viewed in Arrow X5 direction in FIG. 10). The section of the column assembly 18 shown in FIG. 8 is a sectional view taken along lines B-B in FIG. 11.

Referring to FIG. 10 and FIG. 11, the column assembly 18 includes a cylindrical shaft member 82, a cylindrical adjustment member 84, a restriction member 86 which has an inverted U-shape in a front view, a cylindrical connection member 88 and a platy reinforcing member 90.

The shaft member 82 is inserted through the adjustment member 84. The shaft member 82 has a lower end 82a, which protrudes downward from the adjustment member 84. The shaft member 82 and the adjustment member 84 are fixed to each other by welding, for example. Referring to FIG. 8, a curved portion 82b, which curves upward substantially in an arc shape as in a side view, is formed on a rear side in the lower end 82a of the shaft member 82.

Referring to FIG. 10 and FIG. 11, the restriction member 86 includes a ceiling portion 86a, a side wall portion 86b, and a side wall portion 86c (see FIG. 11). The ceiling portion 86a has a gently curving rear portion 86d and a through-hole 86e. The shaft member 82 and the adjustment member 84 are inserted through the through-hole 86e. The adjustment member 84 has a lower end 84a, which is located downward from the ceiling portion 86a. The adjustment member 84 and the ceiling portion 86a are fixed to each other by welding for example.

Referring to FIG. 10, a curved portion 86g, which curves upward substantially in an arc shape, is formed at a substantially center portion in the fore-aft direction in an outer edge 86f of the side wall portion 86b. Likewise, a curved portion 86i (see FIG. 8), which curves upward substantially in an arc shape, is formed at a substantially center portion in the fore-aft direction in an outer edge 86h (see FIG. 8 and see FIG. 11) of the side wall portion 86c (see FIG. 8 and see FIG. 11).

The curved portion 86g (see FIG. 10) in the side wall portion 86b (see FIG. 10), the curved portion 82b (see FIG. 8) in the shaft member 82 (see FIG. 8) and the curved portion 86i (see FIG. 8) in the side wall portion 86c (see FIG. 8) are fixed to an outer circumferential surface of the connection member 88 by welding, for example. As shown in FIG. 11, the connection member 88 has an end 88a, which protrudes more outward than the side wall portion 86b of the restriction member 86; and another end 88b, which protrudes more outward than the side wall portion 86c. Also, the shaft member 82 is fixed at an axially center portion in the connection member 88.

Referring to FIG. 10, the shaft member 82 has a center axis 82d, which is located at a more forward position than a center axis 88c of the connection member 88 when viewed from the side. Referring to FIG. 11, the center axis 82d and the center axis 88c are perpendicular or substantially perpendicular to each other when viewed from the front.

Referring to FIG. 10 and FIG. 11, the reinforcing member 90 is provided inside the restriction member 86 in order to reinforce the restriction member 86. Referring to FIG. 8 and FIG. 10, the reinforcing member 90 has a lower portion which is bent rearward to extend obliquely downward. Referring to FIG. 10 and FIG. 11, the reinforcing member 90 has an upper end portion 90a, which is fixed to the ceiling portion 86a by welding for example. Referring to FIG. 11, the reinforcing member 90 has a side end portion 90b, which is fixed to the side wall portion 86b by welding, for example; and a side end portion 90c, which is fixed to the side wall portion 86c by welding for example. The reinforcing member 90 has a lower end portion 90d, which is fixed to an outer circumferential surface of the connection member 88 as well as to an outer circumferential surface of the shaft member 82 by welding for example.

Figure 12:
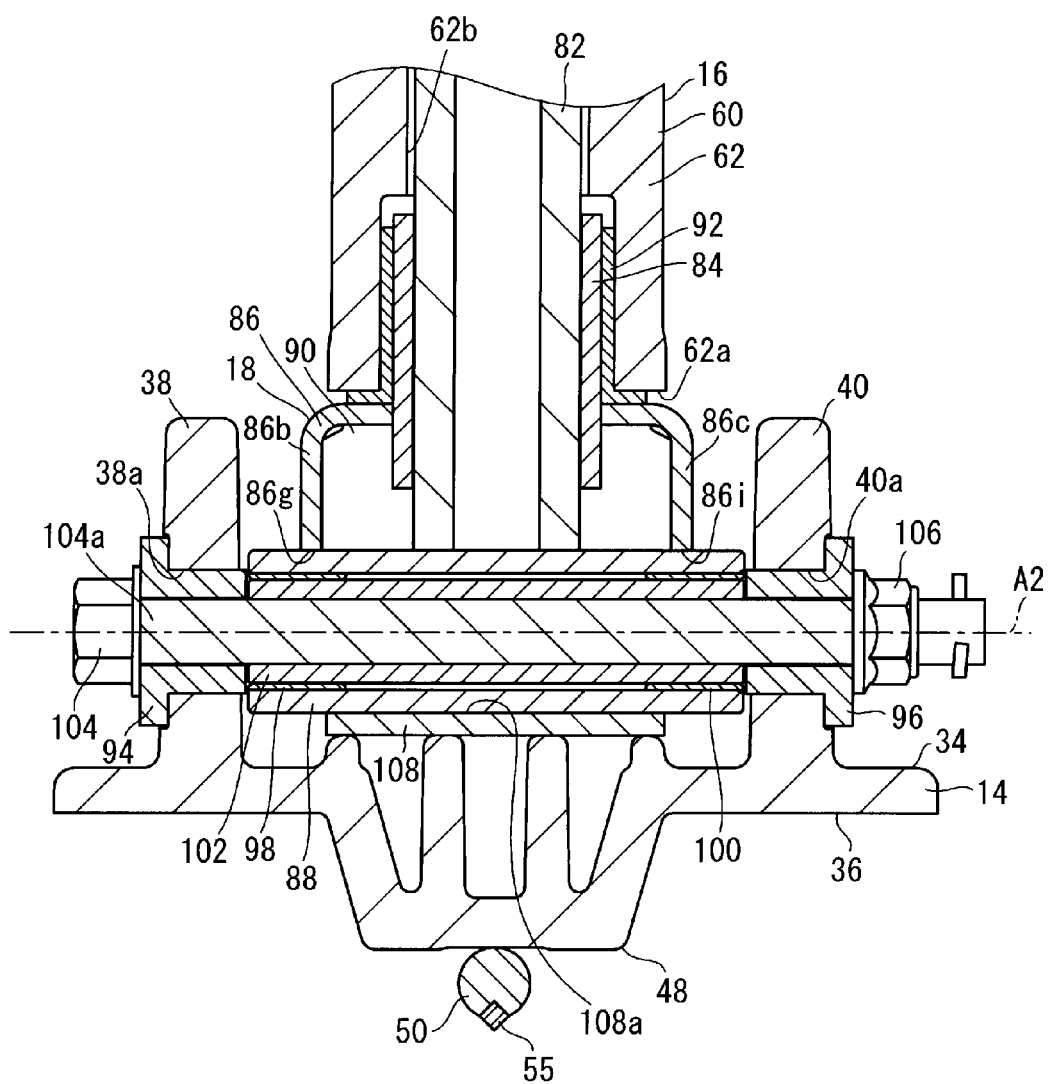
FIG. 12 is a sectional view showing how the ski, the column assembly, and the steering knuckle are connected.
Figure 13:
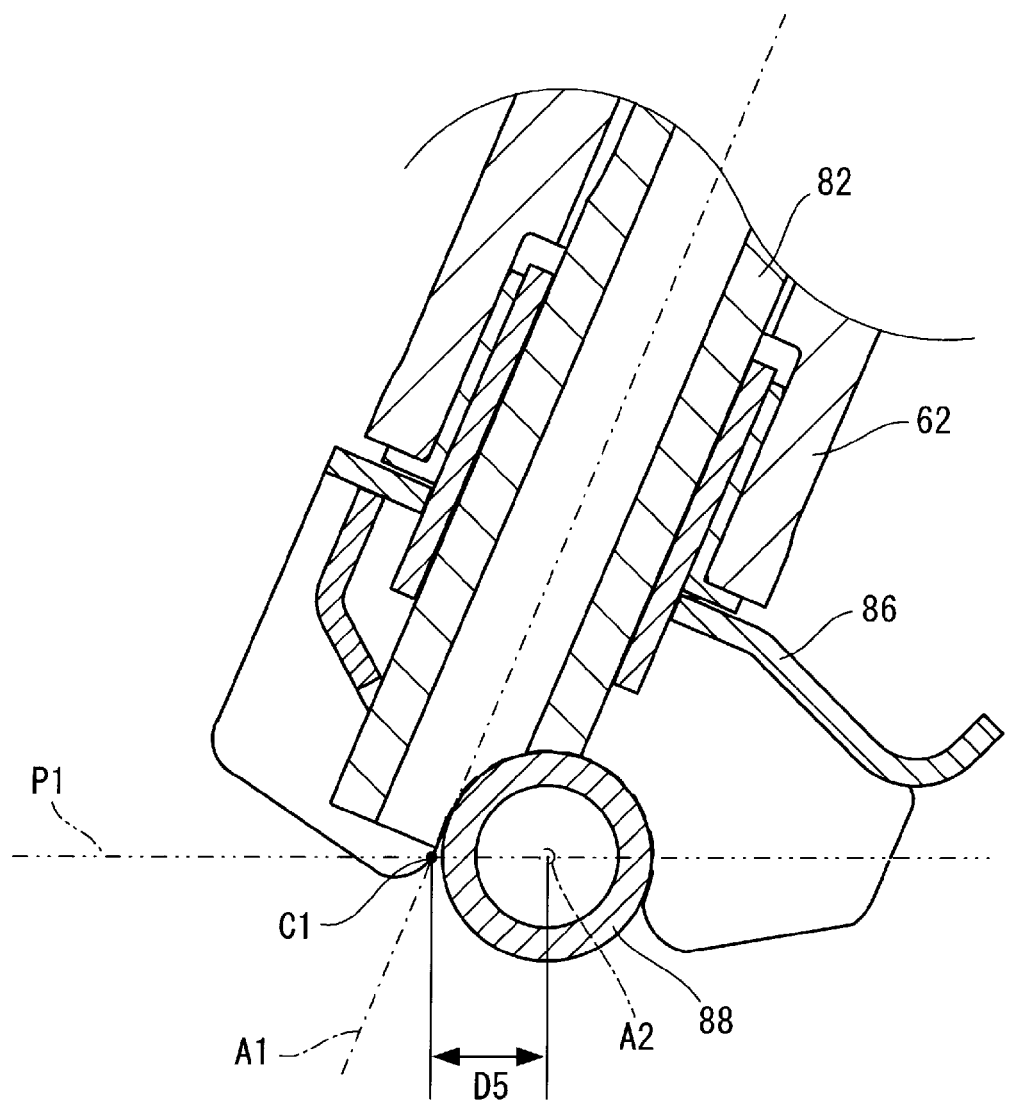
FIG. 13 is a diagram showing a positional relationship between a first pivot axis and a second pivot axis.

FIG. 12 is a sectional view (taken along Arrow X4 direction in FIG. 8), which shows how the ski 14, the column assembly 18, and the steering knuckle 60 are connected. Referring to FIG. 8 and FIG. 12, in the main body portion 62 of the steering knuckle 60, a generally cylindrical bushing 92 is fitted into the communication hole 62b from the lower end 62a. Referring to FIG. 8, in the main body portion 62, a generally cylindrical bushing 93 is fitted into the communication hole 62b from the recess 65. The shaft member 82 of the column assembly 18 is inserted into the main body portion 62 so that an outer circumferential surface of the adjustment member 84 is supported by the bushing 92 and an outer circumferential surface of the shaft member 82 is supported by the bushing 93. The shaft member 82 is rotatable with respect to the bushing 93, and the adjustment member 84 is rotatable with respect to the bushing 92. Thus, the shaft member 82 is rotatable about the first pivot axis A1 which is an axis extending substantially in the vertical direction. A center axis 62f (see FIG. 9) of the main body portion 62 and the center axis 82d (see FIG. 10) of the shaft member 82 are substantially identical with the first pivot axis A1. It should be noted here that as shown in FIG. 13, the first pivot axis A1 is at a more forward position than the second pivot axis A2 within a virtual horizontal plane P1 which includes the second pivot axis A2. Preferably, a distance D5 from an intersection C1 made by the horizontal plane P1 and the first pivot axis A1 to the second pivot axis A2 is not smaller than about 15 mm, for example.

Referring to FIG. 8, inside the recess 65 of the main body portion 62, the pivot member 26f of the link mechanism 26 (see FIG. 2) is fixed to an upper portion 82c of the shaft member 82. Thus, the pivot member 26f is pivotable about the first pivot axis A1.

Referring to FIG. 12, a generally cylindrical flange member 94 is provided inside the through-hole 38a of the side wall portion 38 whereas a generally cylindrical flange member 96 is provided inside the through-hole 40a of the side wall portion 40. Cylindrical bushings 98, 100 are provided rotatably inside the connection member 88 of the column assembly 18. Inside the bushings 98, 100, a cylindrical collar 102 is inserted rotatably. A bolt 104 has its shank 104a inserted through the flange member 94, the collar 102 and the flange member 96. A nut 106 is threaded to a tip of the shank 104a. Thus, the connection member 88 of the column assembly 18 and the ski 14 are connected with each other. Via the bolt 104, the ski 14 is supported by the connection member 88 pivotably in the vertical direction about the second pivot axis A2. The center axis 88c (see FIG. 10) of the connection member 88 is substantially identical with the second pivot axis A2. It should be noted here that FIG. 8 does not show the bushings 98, 100 or the collar 102 so that the figure will not be too complicated.

Figure 14:
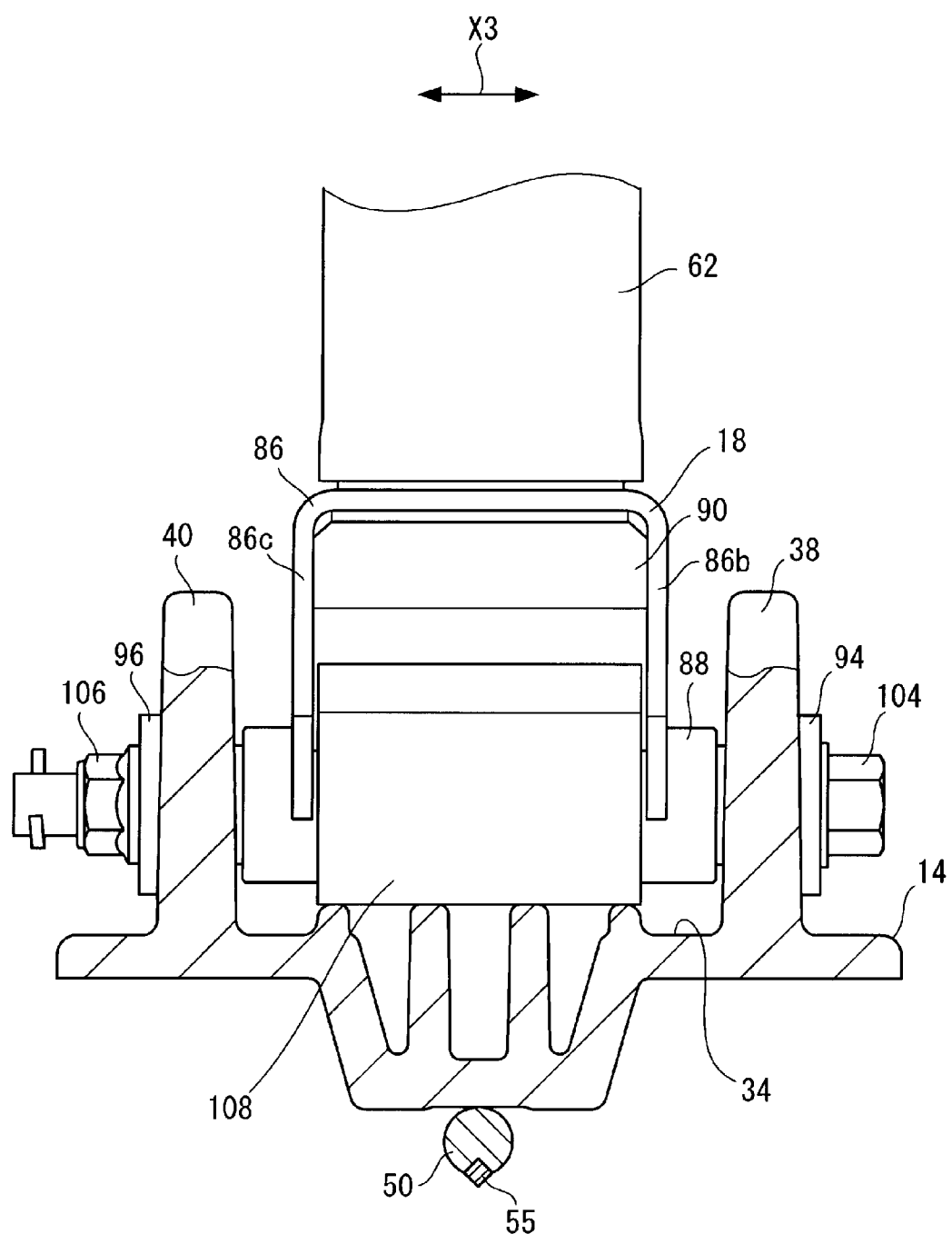
FIG. 14 is an explanatory drawing which shows the ski, the column assembly, and the steering knuckle.
Figure 15:
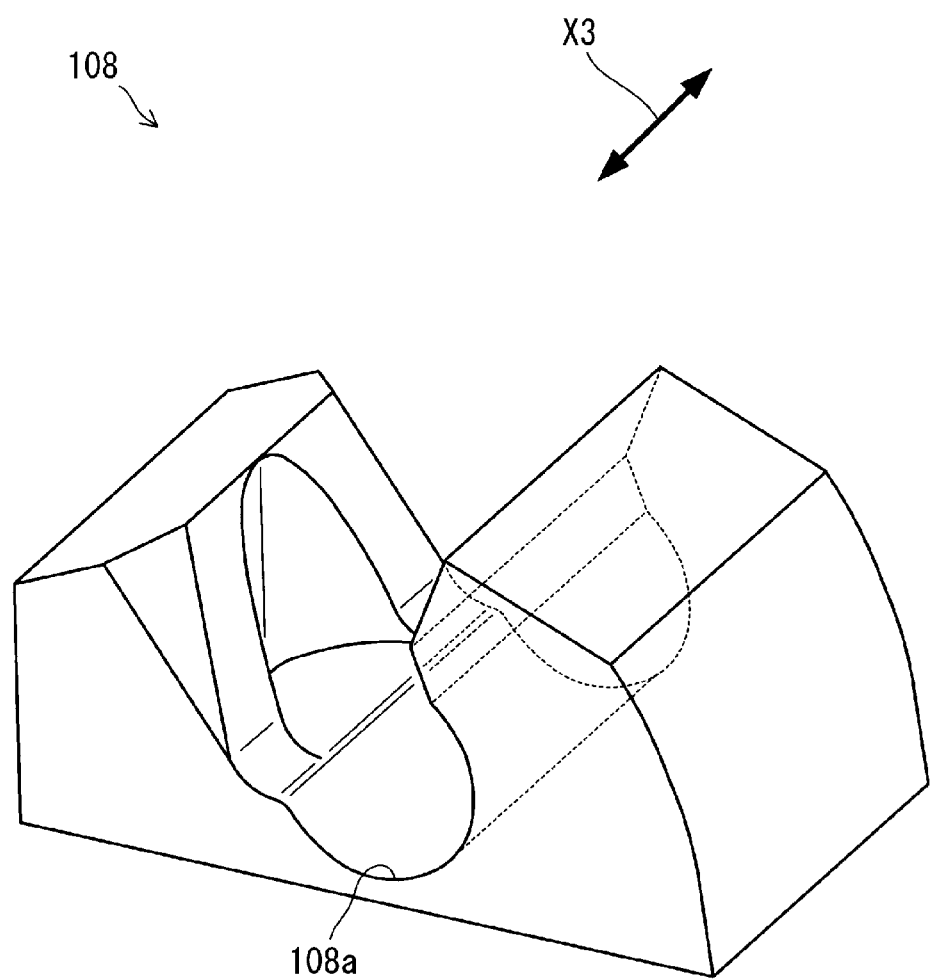
FIG. 15 is a perspective view showing a stopper member.

FIG. 14 is an explanatory drawing of the ski 14, the column assembly 18, and the steering knuckle 60 viewed in Arrow X6 direction in FIG. 8. Referring to FIG. 8, FIG. 12, and FIG. 14, a stopper member 108, which is generally U-shaped in a side view, is provided between the ski 14 and the column assembly 18. The stopper member 108 is an elastic member made of rubber etc., for example. Referring to FIG. 15, the stopper member 108 has an upper surface, which is recessed at a center portion thereof as a substantially arc shaped recess 108a extending in the widthwise direction (Arrow X3 direction). Referring to FIG. 8 and FIG. 14, the stopper member 108 is provided between the side wall portion 86b (see FIG. 14) and the side wall portion 86c of the restriction member 86. Referring to FIG. 14, the stopper member 108 is restricted in its movement in Arrow X3 direction (the widthwise direction) by the side wall portions 86b, 86c of the restriction member 86. Referring to FIG. 8 and FIG. 12, the connection member 88 of the column assembly 18 is fitted into the recess 108a. Thus, the stopper member 108 is restricted in its upward movement. Referring to FIG. 8, the vertical pivoting movement of the ski 14 about the second pivot axis A2 is restricted when the stopper member 108 makes contact with the ceiling portion 86a of the restriction member 86 or the reinforcing member 90.

In the present preferred embodiment, the link mechanism 26 and the column assembly 18 preferably function as the connecting section.

According to the configuration described above, when a human rider operates the steering mechanism 22 (see FIG. 2), the operation is transmitted via the steering shaft 24 (see FIG. 1) and the link mechanism 26 (see FIG. 2) to the shaft member 82 of the column assembly 18 (see FIG. 8). Thus, the shaft member 82 (FIG. 8) rotates about the first pivot axis A1, and the ski 14 (FIG. 8) pivots about the first pivot axis A1 in a horizontal direction. As a result, the snowmobile 10 is steered. It should be noted here with reference to FIG. 8 that the lower surface 36 of the ski 14 pivots about a point 36a (hereinafter called the pivot center 36a) on the first pivot axis A1.

Now, reference will be made to FIG. 4B. When the straight portion 42 is horizontal, the horizontal distance D2 between the rear end 42d of the straight portion 42 (the second straight portion 42b) and the second pivot axis A2 is longer than the horizontal distance D1 between the fore end 42c of the straight portion 42 (the first straight portion 42a) and the second pivot axis A2. In this case, it is possible in the straight portion 42 to ensure an area of contact between a rearward segment which is behind the second pivot axis A2 (the second straight portion 42b) and the snow surface (not illustrated). This makes it possible to improve a straight travel characteristic of the snowmobile 10. It should be noted here that even if the straight portion 42 has an extended rear segment behind the second pivot axis A2, the power steering device 28 assists the rotating operation of the steering shaft 24, thereby preventing the steering load from increasing.

Also, referring to FIG. 13, within the horizontal plane P1, the first pivot axis A1 is located at a more forward position than the second pivot axis A2. With reference to FIG. 8, therefore, when the ski 14 pivots in a horizontal direction, the pivot center 36a of the lower surface 36 in the ski 14 is at a more forward position than the second pivot axis A2. In this case, when the steering mechanism 22 is operated by a large steering angle (when the body 12 makes a sharp turn), a portion of the lower surface 36 in the ski 14 under the second pivot axis A2 moves to outside of the first pivot axis A1 with respect to the turning direction. Meanwhile, even if the ski 14 pivots in the vertical direction, the portion of the lower surface 36 in the ski 14 under the second pivot axis A2 pivots very little in the vertical direction. Therefore, even when the body 12 makes a sharp turn, it is possible to surely support the load from the body 12 by the portion of the lower surface 36 in the ski 14 under the second pivot axis A2. This reduces rolling of the body 12 during cornering operations, i.e., this improves a cornering characteristic of the snowmobile 10. It should be noted here that generally, in order to improve the cornering characteristic of a snowmobile, it is necessary to increase the length of a portion ahead of the second pivot axis in the ski. In this case, however, it becomes difficult to improve the straight travel characteristic. For this reason, conventionally, it has not been easy to improve both the straight travel characteristic and the cornering characteristic. On the contrary, according to the snowmobile 10, it is possible to improve the cornering characteristic as described earlier by an arrangement that the first pivot axis A1 is located at a more forward position than the second pivot axis A2 within the horizontal plane P1 which includes the second pivot axis A2. This eliminates the need for increasing the length of the portion ahead of the second pivot axis A2 in the ski 14 in order to improve the cornering characteristic, making it possible to improve both the straight travel characteristic and the cornering characteristic.

Also, referring to FIG. 4A and FIG. 4B, when the straight portion 42 is horizontal, the fore end 48*d* of the keel portion 48 is at a lower position than the second pivot axis A2. In other words, the keel portion 48 is not formed in the approach portion 44 on its fore side (above side) of the ski 14. In this case, even if a rut, etc., is already formed on the snow surface, the keel portion 48 is not easily set in the rut, etc., when the approach portion 44 makes contact with the snow surface. This provides easy steering of the snowmobile 10, and provides a comfortable ride on the snowmobile 10.

Also, in the side surface 48*a* of the keel portion, the region 48*f* under the second straight portion 42*b* (region behind the second pivot axis A2 and ahead of the rear end 42*d* of the straight portion 42) has a larger area than the region 48*e* under the first straight portion 42*a* (region ahead of the second pivot axis A2 and behind the fore end 42*c* of the straight portion 42). Likewise, in the side surface 48*b* of the keel portion 48, the region under the second straight portion 42*b* (region behind the second pivot axis A2 and ahead of the rear end 42*d* of the straight portion 42) has a larger area than the region under the first straight portion 42*a* (region ahead of the second pivot axis A2 and behind the fore end 42*c* of the straight portion 42). In this case, it is possible to ensure snow contact areas in regions behind the second pivot axis A2 and ahead of the rear end 42*d* of the second straight portion 42*b* (straight portion 42) in the side surfaces 48*a*, 48*b* of the keel portion 48. This makes it possible to further improve the straight travel characteristic of the snowmobile 10.

Also, the chip member 55 is fixed to the runner 50 so that the center 55*a* in the fore-aft direction (longitudinal direction) of the chip member 55 is located at a more forward position than the second pivot axis A2. In this case, it is possible to make the center 55*a* of the chip member 55 close to the pivot center 36*a* (see FIG. 8) in the lower surface 36 of the ski 14. This makes it possible to further improve the cornering characteristic of the snowmobile 10.

Also, referring to FIG. 5, when the straight portion 42 is horizontal, the vertical distance D4 (about 33 mm, for example) between the straight portion 42 and the lower end 55*b* of the chip member 55 is sufficiently long. In this case, working of the chip member 55 (the runner 50) is improved, resulting in further improvement in the cornering characteristic.

In the above preferred embodiments, description was made for a case where the engine 30 preferably is a four-cylinder four-stroke engine which has a displacement of about 1,000 cc. However, the engine 30 is not limited to the example described above. For example, a two-cylinder or a three-cylinder engine or one which has five or more cylinders may be used. The engine may be a two-stroke engine. Also, the engine may have a greater displacement than 1,000 cc, or a smaller displacement than 1,000 cc. For example, a three-cylinder 800 cc engine may be used.

Also, in the above preferred embodiment, description was made for a case where the arm mechanism 16 preferably includes a steering knuckle 60. However, the arm mechanism may not have a steering knuckle 60. In this case, a column assembly may be attached to an upper arm mechanism and a lower arm mechanism of the arm mechanism, rotatably about the first axis line.

Also, in the above preferred embodiment, the straight portion 42 is a portion extending straightly in the lower surface 36 of the ski 14. However, the straight portion is not limited to portions which extend along a true straight line. For example, the straight portion may be a portion which extends along an arc of an extremely large radius (not smaller than about 8,000 mm, for example). Also, a vertically upward recess may be formed locally or within a small range in the straight portion.

The present invention being thus far described in terms of preferred embodiments, it is obvious that these may be varied in many ways within the scope and the spirit of the present invention. The scope of the present invention is only limited by the accompanied claims.

The invention claimed is:

1. A snowmobile comprising:
a body;
a steering mechanism;
a steering shaft connected to the steering mechanism and arranged to operate in association with the steering mechanism;
a power steering device connected to the steering shaft;
a pair of skis;
a runner provided in a lower surface of each of the skis; and
a connecting section arranged to connect the pair of skis with the body and to support the skis for pivotal movement in a horizontal direction about a first pivot axis in association with movement of the steering shaft, and for pivotal movement in a vertical direction about a second pivot axis which extends in a widthwise direction of the body; wherein
the first pivot axis is located at a more forward position than the second pivot axis in a horizontal plane which includes the second pivot axis;
each of the skis includes, in the lower surface of the ski, a straight portion extending straight, an approach portion arranged forward of the straight portion and curving upward, and a keel portion protruding downward to a lower position than the straight portion and the approach portion;
a horizontal distance between the second pivot axis and a rear end of the straight portion is longer than a horizontal distance between the second pivot axis and a fore end of the straight portion, and a fore end of the keel portion is at a lower position than the second pivot axis, when the straight portion is horizontal;
the runner is provided in the keel portion of each of the skis; and
the keel portion includes a side surface including a first region between the second pivot axis and the rear end of the straight portion having a larger area than a second region between the second pivot axis and the fore end of the straight portion, when the straight portion is horizontal.

2. The snowmobile according to claim 1, further comprising a four-stroke engine defining a power source and being located in a front portion of the body.

3. A snowmobile comprising:
a body;
a steering mechanism;
a steering shaft connected to the steering mechanism and arranged to operate in association with the steering mechanism;
a power steering device connected to the steering shaft;
a pair of skis;
a runner provided in a lower surface of each of the skis; and
a connecting section arranged to connect the pair of skis with the body and to support the skis for pivotal movement in a horizontal direction about a first pivot axis in association with movement of the steering shaft, and for pivotal movement in a vertical direction about a second pivot axis which extends in a widthwise direction of the body; wherein the first pivot axis is located at a more forward position than the second pivot axis in a horizontal plane which includes the second pivot axis;

each of the skis includes, in the lower surface of the ski, a straight portion extending straight, an approach portion arranged forward of the straight portion and curving upward, and a keel portion protruding downward to a lower position than the straight portion and the approach portion;

a horizontal distance between the second pivot axis and a rear end of the straight portion is longer than a horizontal distance between the second pivot axis and a fore end of the straight portion, and a fore end of the keel portion is at a lower position than the second pivot axis, when the straight portion is horizontal;

the runner is provided in the keel portion of each of the skis;

the snowmobile further comprises a chip member provided in the runner and arranged to protrude downward to a lower position than the runner; and the chip member has a center in a fore-aft direction located at a more forward position than the second pivot axis.

4. The snowmobile according to claim 3, further comprising a four-stroke engine defining a power source and being located in a front portion of the body.

\* \* \* \* \*